UNITED STATES PATENT OFFICE.

VICENTE GONZÁLEZ LORENZO, OF HABANA, CUBA.

PREPARATION FOR THE NEUTRALIZATION OF THE ACIDS AND THE PRECIPITATION OF SALTS CONTAINED IN WATERS.

1,399,266. Specification of Letters Patent. Patented Dec. 6, 1921.

No Drawing. Application filed December 7, 1920. Serial No. 428,935.

*To all whom it may concern:*

Be it known that I, VICENTE GONZÁLEZ LORENZO, citizen of the Republic of Cuba, residing at Habana, Cuba, have invented new and useful Improvements in a Preparation for the Neutralization of the Acids and the Precipitation of Salts Contained in Waters, of which the following is a specification.

This invention relates to a product for purifying waters, neutralizing the acids and precipitating the salts which the same contain in solution, and has for its object to free impurities contained in the waters employed in steam generators and similar apparatus, avoiding the formation of incrustations and the danger of the metals of which said generators are made, being attacked thereby.

The presence of incrustations or scales in boilers or steam generators, is the cause of a great loss of fuel. burnings and breakages, predisposing the generators to explosions and giving place to frequent and costly repairs. It is, therefore, essential to avoid the formation of these incrustations, which depend generally on the kind of substances contained in solution or in suspension in the waters.

At present there have been employed for this purpose and with more or less success, several products, all of them, however, having certain defects. Those which contain organic substances rather help than avoid the incrustations; the molasses, vinegars, residues of distillation and other similar products impede the incrustations by reason of the acetic acid contained in the same, but attacking the iron, and furthermore, if the waters contain sulfate of lime, the organic substances combine with it, producing a very hard, adherent and abundant scale.

To overcome these and many other inconveniences, I have devised the combination of certain products, obtaining a solution which neutralizes the acids and precipitates the salts contained in the waters, without causing any harm to the metal of boiler, avoiding the formation of incrustations by changing the nature of the waters and producing a soft precipitate, which may be easily extracted from the generators by mechanical means now in use, such as the valves generally provided in order to effect the cleaning of boilers.

The mentioned solution is composed of hydrate of sodium, sulfate of soda, phosphate of soda and tannin, in chemically pure water or in common water, and varying the proportions of said substances with the kind of water which is employed for the solution.

In practice I have found that when distilled or chemically pure water is used as a solvent, the following proportions of said substances should be used, for every 1,000 c. c. of water:

Hydrate of sodium___ 430 grams.
Sulfate of soda_____ 26 grams.
Phosphate of soda___ 1½ grams.
Tannin_____ 1 centigram.

When the common water is employed, the proportions should be increased as follows:

Hydrate of sodium____ 450 grams.
Sulfate of soda_____ 30 grams.
Phosphate of soda____ 2 grams.
Tannin_____ 1 centigram.

The proportions just mentioned are ones which in the practice have proven to be the most suitable according to the elements contained in the waters; but these proportions may be altered without in any way changing the essence of the invention, as follows: 5 grams more or less of hydrate of sodium, 2 grams more or less of sulfate of soda, 50 centigrams more or less of phosphate of soda, and leaving the quantity of tannin unchanged.

The operations which are necessary for obtaining the final product, are carried out as follows:

Primarily the hydrate of sodium is dissolved in 500 c. c. of water in a suitable recipient, and in another one is effected the solution of the sulfate of soda and the phosphate of soda, and then both of the solutions are mixed. The tannin may be added to any one of the solutions when desired.

In the case where common water is employed as a solvent agent, it is necessary to employ vessels provided with some mechanical means which will permit the separation of the solution, on one hand the precipitates formed from the impurities and the organic substances contained in the water, and on the other hand extracting the solution completely clean and free of said precipitates.

For this end may be employed, for instance, a vessel having an inverted cone bottom with an exhaust valve at the apex thereof, in order to draw off the precipitates or sediments which may settle in the cone shaped bottom, arranging another valve at a higher level so as to realize through it the extraction of the pure liquid.

It is obvious that minor changes may be made in the invention without departing from the material principles thereof. Therefore it is not desired to confine the invention to the exact form herein described, but it is wished to include all such as properly come within the scope of the appended claims.

Having thus described the invention, what is claimed as new, is:

1. A solution for the neutralization of the acids and precipitation of the salts contained in water, consisting of approximately 430–450 grams of hydrate of sodium, 26–30 grams of sulfate of soda, 1½–2 grams of phosphate of soda and 1 centigram of tannin, to 1000 c. c. of water.

2. A solution for the neutralization of the acids and precipitation of the salts contained in water, consisting of from 430 grams of hydrate of sodium, 26 grams of sulfate of soda, 1½ grams of phosphate of soda and 1 centigram of tannin, to 1000 c. c. of distilled water.

In testimony whereof I have signed my name to this specification.

VICENTE GONZÁLEZ LORENZO.